F. Speck,
Water Wheel,
N°58,906.    Patented Oct. 16, 1866.
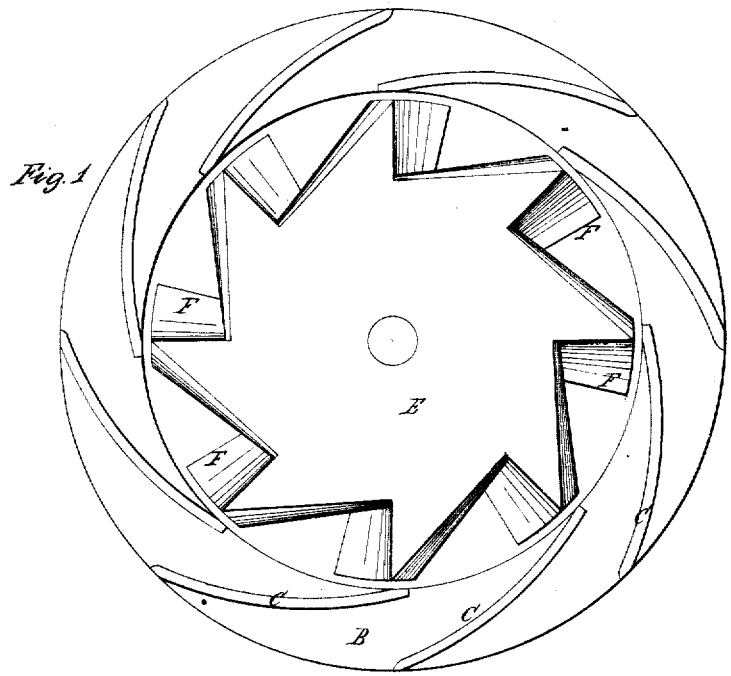
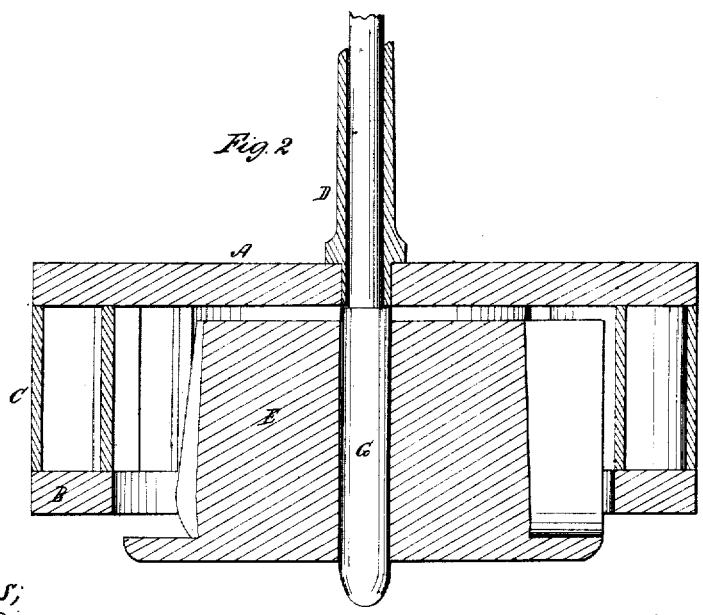
Witnesses;
John P. Jacobs
C. Alexander
Inventor:
Frederick Speck
per Alexander & Mason
Atty.

UNITED STATES PATENT OFFICE.

FREDERICK SPECK, OF WAYNESBOROUGH, PENNSYLVANIA.

IMPROVEMENT IN WATER-WHEELS.

Specification forming part of Letters Patent No. 58,906, dated October 16, 1866.

*To all whom it may concern:*

Be it known that I, FREDERICK SPECK, of Waynesborough, in the county of Franklin and State of Pennsylvania, have invented certain new and useful Improvements in Water-Wheels; and I do hereby declare that the following is a full, clear, and exact description of the same, reference being had to the accompanying drawings, and to the letters of reference marked thereon.

In the annexed drawings, making part of this invention, Figure 1 represents a plan view with the cap or top of the upper wheel taken off. Fig. 2 represents a vertical section.

This wheel consists of two parts—an inner and an outer wheel.

The outer wheel is formed by taking a disk or wheel, A, and a rim, B, separating and securing them together by means of a series of curved tangential buckets, C C C, which are placed between them, as shown. To the wheel or disk A, at its center, is secured a hollow shaft, D.

E represents the inner wheel, which is made of a solid block, with buckets cut in its periphery, which buckets may be made straight from top to bottom, or they may be curved near the bottom, as is the case in this instance.

G represents a shaft, which passes through the center of this wheel from its under side, sufficient of the end of said shaft being left below the wheel to make a bearing, which it has in an opening in a suitable step. This shaft G is continued above the wheel E, and passes through the hollow shaft D of wheel above.

Water is admitted to the inner wheel through the openings formed between the buckets C C, and striking the buckets of the wheel E drives said wheel in one direction, while the reaction of the water causes the outer wheel to move in the opposite direction.

In transferring power from this wheel, it will be necessary to have the two shafts D and G so connected by gearing that they will act in one direction, thus obtaining the power of both the inner and outer wheels.

Having thus fully described my invention, what I claim as new, and desire to secure by Letters Patent, is—

The combination of the outer and inner wheels as constructed and arranged together, whereby the water, first passing through the buckets of the outer wheel, acts directly upon the buckets of the inner wheel, substantially as and for the purpose set forth.

In witness that I claim the foregoing I have hereunto set my hand in the presence of witnesses.

FREDERICK SPECK.

Witnesses:
C. M. ALEXANDER,
J. M. MASON.